(No Model.)
J. H. RANSOM.
BICYCLE BRAKE.
No. 554,031.　　　　　　　　Patented Feb. 4, 1896.
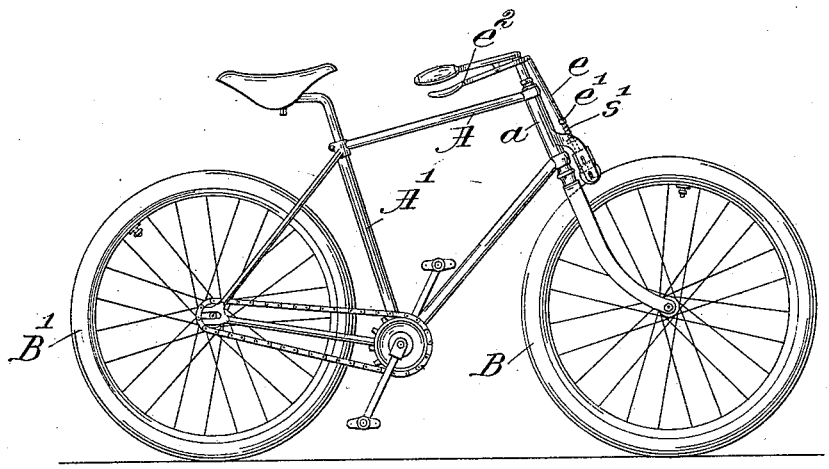
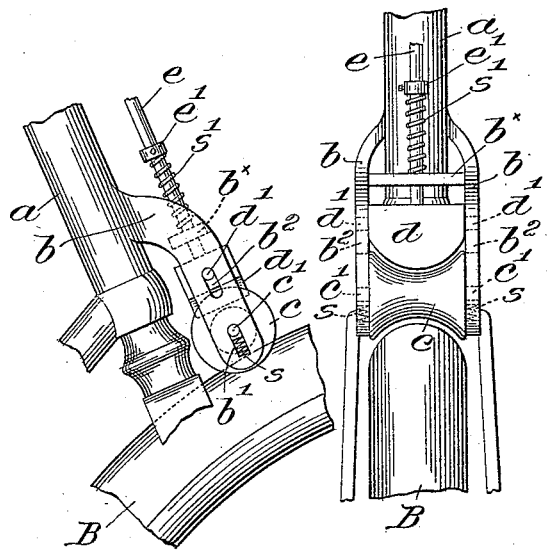
Witnesses:
Fred S. Greenleaf.
John F. C. _____
Inventor:
Jonathan H. Ransom
by Crosby & Gregory
attys.

UNITED STATES PATENT OFFICE.

JONATHAN H. RANSOM, OF WEST NEW BRIGHTON, NEW YORK.

BICYCLE-BRAKE.

SPECIFICATION forming part of Letters Patent No. 554,031, dated February 4, 1896.

Application filed August 22, 1895. Serial No. 560,152. (No model.)

*To all whom it may concern:*

Be it known that I, JONATHAN H. RANSOM, of West New Brighton, county of Richmond, State of New York, have invented an Improvement in Bicycle-Brakes, of which the following description, in connection with the accompanying drawings, is a specification, like letters on the drawings representing like parts.
This invention has for its object the production of a simple and effective brake for bicycles and the like, whereby the pressure is applied to the rim or tire in such manner that abrasion or cutting of the tire is prevented.

My improved brake is particularly well adapted for use with pneumatic tires, which are readily worn and cut by sudden application of the usual brake.
Figure 1 in side elevation represents a bicycle of the well-known "safety" type with one form of my invention applied thereto. Fig. 2 is an enlarged detail of a portion of the front fork and part of the rim of the front wheel and showing more clearly the construction of the brake, and Fig. 3 is a front elevation of the parts shown in Fig. 2.

The bicycle-frame A is of any desired or well-known construction, and I have herein shown the head $a$ as having secured thereto by welding or otherwise a yoke $b$, the arms being downturned toward the front wheel, B. Near the lower ends the arms $b$ are preferably slotted at $b'$ to receive and form bearings for the journals $c'$ of the brake-shoe $c$, of rubber, metal or other suitable material, and preferably shaped to fit the convexity of the tire, as clearly shown in Fig. 3. The shoe $c$ is preferably revoluble in its bearings, and I prefer to normally maintain it entirely out of contact with the wheel-tire by means of suitable springs $s$, held in the slots $b'$ and pressing the journals $c'$ upward. Slots $b^2$ are also made in the yoke-arms to receive studs or projections $d'$ on a slide block or presser $d$, having its lower end convexed to correspond to the contour of the brake-shoe $c$. The usual brake-rod $e$ is extended through a cross-girt $b^\times$ of the yoke and secured to the sliding presser $d$, and a spring $s'$ surrounding the rod between a collar $e'$ thereon and the cross-girt normally maintains the rod and presser elevated, as shown in the drawings.

By means of the handle $e^2$, Fig. 1, the brake-rod is depressed to bring the presser $d$ against the brake-shoe $c$, which in turn is pressed against the tire, the latter rotating the shoe in its bearings until the pressure is sufficient to stop the rotation of the wheel and shoe. In this manner the wheel is braked by a rolling pressure applied to the tire, avoiding abrasion or cuts and greatly reducing the wear.

While I have shown herein the brake applied to the front wheel it will be obvious that it could be applied with equal facility to the rear wheel, B', the yoke $b'$ in such instance being secured to the main upright A', Fig. 1, and connected in any desirable manner with the brake-handle.

My improved brake can be readily applied to bicycles and operated by the common brake-lever mounted on the handle-bar.

I claim—

A bicycle-brake, comprising a rigidly-supported yoke, a roller brake-shoe concaved to fit the tire, journals for said shoe to enter upright slots in the yoke, springs to support said journals yieldingly and normally maintain the brake-shoe elevated in inoperative position, and a sliding presser guided in the yoke and convexed at its lower end to correspond to the surface of and force the shoe against the tire, when the presser is lowered, substantially as described.

In testimony whereof I have signed my name to this specification in the presence of two subscribing witnesses.

JONATHAN H. RANSOM.

Witnesses:
PETER J. THORNE,
S. W. GILES.